United States Patent [19]

Ferrer

[11] Patent Number: 4,971,746
[45] Date of Patent: Nov. 20, 1990

[54] PROCESS FOR OBTAINING SIMPLE AND/OR COMPOUND WAX HONEYCOMBS

[76] Inventor: Carlos V. Ferrer, 114, Tarragona Street, 08015 Barcelona, Spain

[21] Appl. No.: 221,780

[22] Filed: Jul. 20, 1988

[30] Foreign Application Priority Data

Jul. 20, 1987 [ES] Spain .................................. 8702373
Jun. 1, 1988 [ES] Spain .................................. 8801734

[51] Int. Cl.⁵ ...................... B29C 39/02; B29C 33/44
[52] U.S. Cl. ..................................... 264/279; 264/313
[58] Field of Search ................. 449/8, 64; 264/313, 264/275, 279, 279.1

[56] References Cited

U.S. PATENT DOCUMENTS

| 2,341,499 | 2/1944 | Cunningham | 264/330 |
|---|---|---|---|
| 3,046,175 | 7/1962 | Bowman | 264/317 |
| 3,923,940 | 12/1975 | Hujii | 264/317 |
| 4,088,723 | 5/1978 | Norton | 264/275 |
| 4,257,998 | 3/1981 | Diepenbrock | 264/275 |
| 4,293,513 | 10/1981 | Langley | 264/308 |
| 4,332,045 | 6/1982 | Schmidt | 449/8 |
| 4,388,263 | 6/1983 | Prunty | 264/313 |
| 4,594,120 | 6/1986 | Bourland | 264/317 |
| 4,651,372 | 3/1987 | Schmidt | 449/8 |
| 4,704,240 | 11/1987 | Reavely | 264/313 |

*Primary Examiner*—Jay H. Woo
*Assistant Examiner*—Jeremiah F. Durkin, II
*Attorney, Agent, or Firm*—Dennison, Meserole, Pollack & Scheiner

[57] ABSTRACT

A process is disclosed for obtaining wax honeycombs using a rigid walled mold made from walls of an elastic material which dilates under heat and contracts when cooled, the mold having at least one wall with a multiplicity of internal, parallelepiped, elastic finger shapes projections of hexagonal section extending partially through the mold. Molten wax is poured into the mold with dilation of the elastic material, and the wax is allowed to cool and solidify with contraction of the elastic material. Finally, the walls are removed from the solidified wax which is in the form of a honeycomb having a multiplicity of hexagonal cells corresponding to the projections, in at least one face.

6 Claims, 2 Drawing Sheets

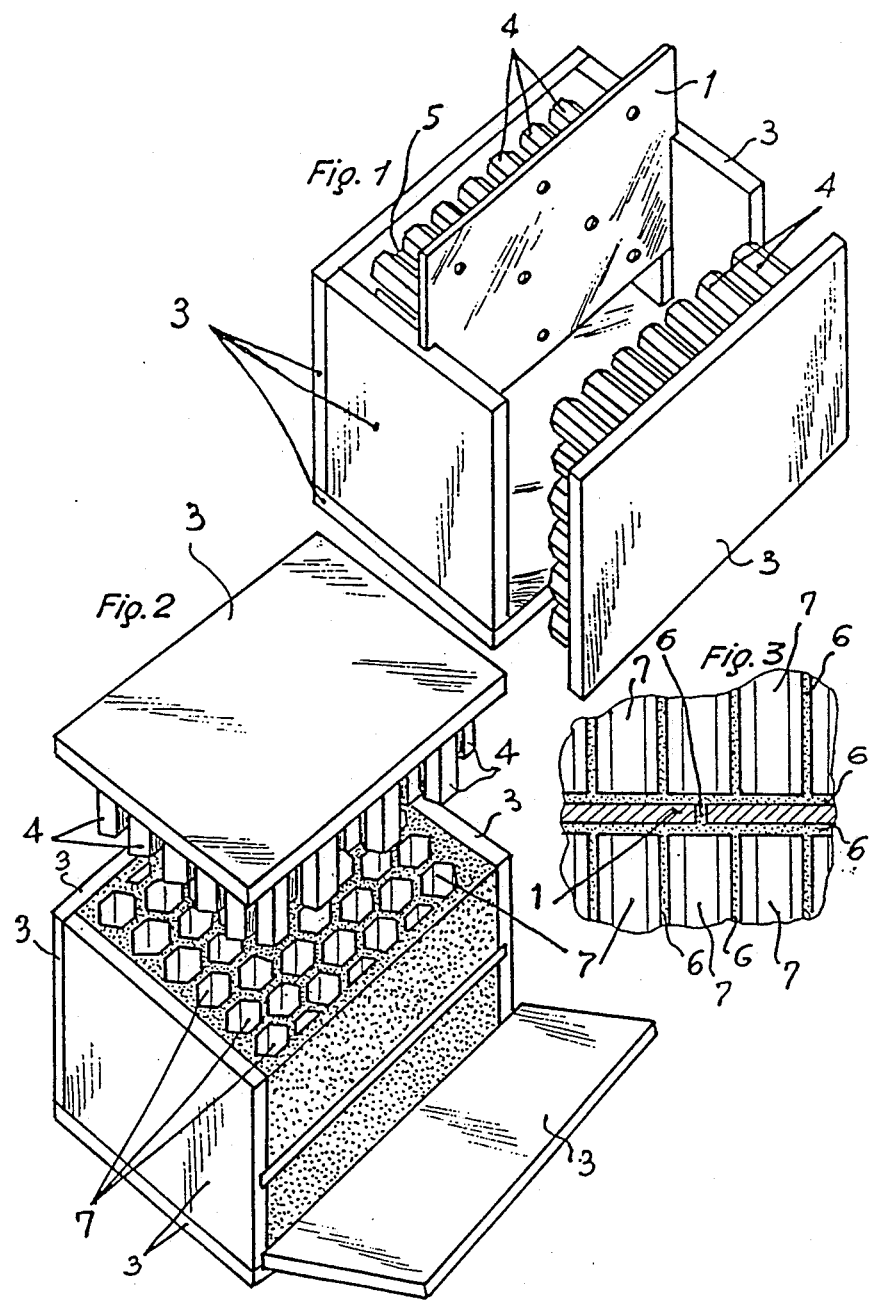

PROCESS FOR OBTAINING SIMPLE AND/OR COMPOUND WAX HONEYCOMBS

BACKGROUND OF THE INVENTION

The Invention relates to a process for obtaining simple and/or compound wax honeycombs.

In the beekeeping industry two types of honeycomb are currently used: one moulded of plastic material and the other one of wax sheets imprinted on both surfaces, with only an engraving of the hexagons for the subsequent operation to be carried out by the bees inside the beehive, on the waxy walls of the parallelepiped of hexagonal section which will constitute each cell.

In the first case, the honeycomb moulded in rigid plastic material have the disadvantage of the bees being inclined to reject them because of the very rigidity of the material and unpleasant odours given off by the solvents used in their formation (granular raw material for subsequent fluidification by heat and moulding), odour given off due to the very nature of the plastic and aggressiveness of the rough and rigid surface of the honeycomb once moulded. In addition, there are thermal problems with a mass made of rigid plastic material which does not have the necessary ductility of Wax, and the internal variations of a "live" beehive.

To persuade bees to accept honeycombs moulded in rigid plastic material, beekeepers resort to the trick of using a waxed layer impregnated with substances which give off familiar odours attractive to bees.

In practice, use of moulded rigid plastic material honeycombs is not very reliable, for when it is least expected the bees discover the deception, rejecting the construction and leading the swarm to go on strike.

Another technical problem is that the moulded rigid plastic material, as indicated above, does not have the sensitivity to heat possessed by wax, so that on hot summer days heat accumulates inside the hive, heat which is beneficial for the seed and larvae inside the reproductive cells. Wax cells walls begin to soften due to excess heat, and this softening warns the bees that the optimum heat heat, which has been reached must not be exceeded, for otherwise the seed and larvae will be killed by excess heat, as will the cells.

This property of wax is not possessed by moulded plastic honeycombs. As there is not softening of the plastic walls prior to fusion, the bees receive no warning and do not carry out forced air ventilation of the hive and establish forced air cooling to keep equilibrium between the optimum temperature for healthy procreation and negative excess heat.

As regards obtaining wax honeycombs with only the outlines of the hexagons imprinted, but not having raised parallelepiped cell walls, these honeycombs which are partially industrially manufactured have another great problem in industrial performance in beehive honey.

This problem is obvious if it is born in mind that bees use approximately 10 kg of honey to obtain 1 kg of wax. It is clear that using wax walls engraved by imprinting and without raised cells walls represents a great loss of money and time for the industrial beekeeper, for the wax used in construction of these walls must be supplied by the bees and put in position, so that they finish the honeycomb partly constructed by industry.

The large amount of money not earned for the amount of honey which is not obtained because the bees are devoting themselves to "in situ" construction of the cell walls means that the apiculturist reuses from one season to the next the honeycombs already centrifuged for extraction of honey.

This practice saves using new sheets of printed wax, and therefore avoids the bees devoting themselves to constructing the cell walls of a new honeycomb. There is the disadvantage, however, that after a while microorganisms develop within the hive, attacking the health of the seed, larvae and bees, and even creating wax-eating larvae.

These micro-organism are a real plague, decimating the bee population with extraordinary virulence in a beehive and in hundreds of hives for many kilometres all around, since the bees carry such micro-organisms on their collection tasks and inoculate the flowers to which other been from other hives subsequently go.

When this happens-and it currently happens very frequently-the hives and all their contents have to be burned.

Thus form the health point of view it is better not to reuse honeycombs from one season to the next, though this is difficult because of the problems mentioned above.

SUMMARY OF THE INVENTION

The object of the invention is to avoid such problems, providing a practical means to obtain honeycombs for hives The process of the invention utilizes a rigid walled mold made from walls of an elastic material which dilates under heat and contracts when cooled, the mold having smooth non-adhesive internal surfaces and at least one wall with a multiplicity of internal, parallelepiped, elastic finger shaped projections of hexagonal section extending partially through the mold, juxtaposed but not touching so that a perimeter space is left between the projections. Molten wax is poured into the mold with dilation of the elastic material, and the wax is allowed to cool and solidify with contraction of the elastic material. Finally, the mold walls are removed from the solidified wax in the form of a honeycomb, having a multiplicity of hexagonal cells corresponding to the projections in at least one face.

BRIEF DESCRIPTION OF THE DRAWINGS

FIG. 1 gives a sketch of the elastic mould, partially closed, with the heart of the honeycomb to be constructed partly introduced, and for greater clarity not showing the flask support of the elastic mould walls.

FIG. 2 shows the elastic mould of FIG. 1, at the phase of demoulding of the already obtained wax honeycomb.

FIG. 3 is a larger-scale sectioned detail of a portion honeycomb obtaining by the procedure.

DESCRIPTION OF THE PREFERRED EMBODIMENTS

Figure 4:
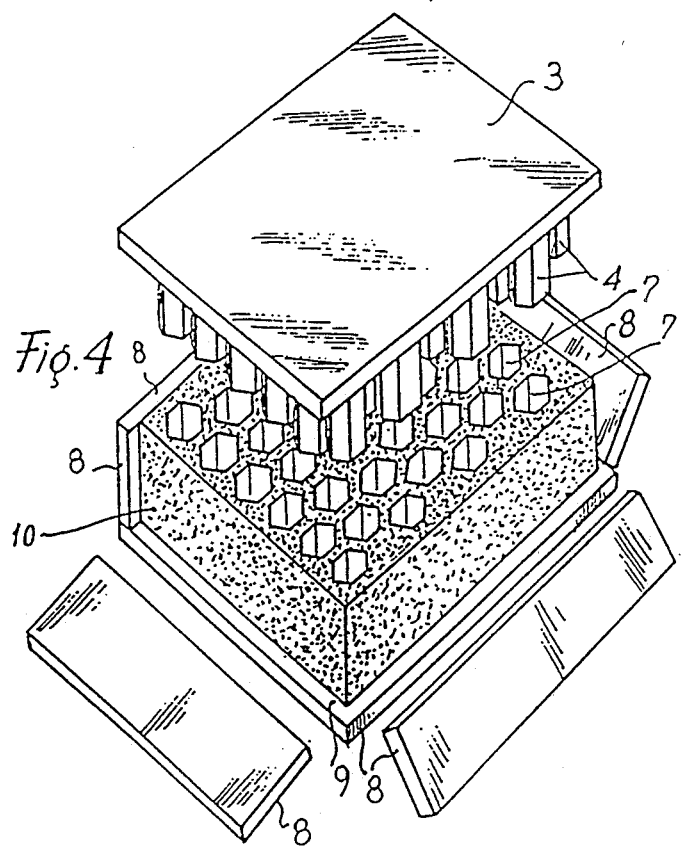
FIG. 4 is an schematic representation of the demoulding operation of the simple wax body obtained with complete wax cells on only one surface and FIG. 5 shows a complete honeycomb, with two bodies, similar to FIG. 4, backed on to each other and permanently joined by the faces with no cells, forming a single composite body with complete cells on the opposing faces.
Figure 5:
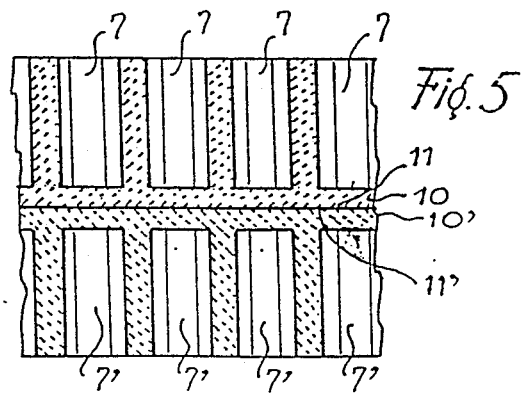

According to one embodiment, shown in FIGS. 1—3, invention consists in taking a core (1) of suitable slightly flexible material, preferably with perpendicular orifices (2) passing from one side through to the opposite one, and placing the core inside a mould (3) with smooth, polished, nonadhesive internal surfaces of an elastic material which dilates under heat, with subsequent contraction as it cools, materials such as silicone elastomers or other suitable ones can be used, with the walls of the elastic mould being held up by external rigid flask walls which are hinged for opening and closing. The elastic mould has projections (4) which are a multiplicity of parallelepiped elastic finger shaped patterns of hexagonal section, duly juxtaposed and close to each other; they do not touch, however, so that a perimeter space (5) is left between each finger shaped pattern (4), thus forming a chamber in which the introduced molten wax (6) is housed. Once set by cooling, the finger shaped patterns (4) contract due to loss of heat, coming away from the wax cells (7) thus formed by moulding on the support core (1); these cells are permanently linked, and they are covered in the same moulding operation with the appropriate layer or wax, with the support core sheet (1) and the cells (7) forming an inseparable whole, so that with contraction of the mass of contractible material of the mould (3) and erectability of the finger shaped patterns (4) reduction of its size is achieved, thus facilitating its withdrawal from the interior of the formed wax cells (7). With the process of the invention we obtain honeycombs of simple or compound wax, with complete cells done, but during the demoulding phase, it has been found that, owing to the central support sheet having on each face the corresponding cells of total configuration and height, the simultaneous existence of each mould and their withdrawal at the same time made much an operation difficult, and sometimes led to breakages of the walls of the little cells due to differences of applied traction stresses.

To avoid this, the honeycombs can be made up of two equal honeycombs with complete cells on only one face, while the opposite face has none. The honeycombs thus constructed are juxtaposed with faces with no cells together, and joined permanently together to form a single sandwich, which then has cells on the two opposing faces.

With this method of making the composition honeycombs, the central support sheet is unnecessary, since the surface from which the cells emerge is obtained in the same operation as moulding of the cells. To facilitate the demoulding of honeycombs with this process, each honeycomb is made as shown in FIG. 4, so that of the two semimoulds (3) of plastic, elastic, contractible material, is deleted, together with the flexible intermediate support sheet (1), while the rigid mould is made in the form of a rigid tray with side walls (8) detachable when desired. The elastic semimould (3) is arranged over the mouth of the tray, ensuring that the elastic and contractible finger shaped patterns (4) do not reach the bottom (9) of the tray, so that between the free ends of the elastic finger shaped patterns (4) and that bottom (9), the wax which is introduced and which fills the cavities and interstices, when it has set and is demoulded by withdrawal of the elastic and contractible finger shape patterns (4), forms a wax body from one of the faces of which there emerge the cells (7), fully formed and concordant in height and section with natural ones made, by bees. The opposing face (11) has no cells, the bodies are joined together, forming a total composite body with the two opposite surfaces having totally formed cells (7 and 7').

Having described the object of the invention it should be recorded that it is susceptible to variations, which do not alter, change or modify the essence of the invention.

What is claimed is:

1. Process for obtaining wax honeycombs comprising:
   forming a rigid walled mold from walls of an elastic material which dilates under heat and contracts when cooled, said mold having smooth non-adhesive internal surfaces, and a pair of opposed walls with a multiplicity of internal, parallelepiped, elastic finger shaped projections of hexagonal section extending partially through said mold, juxtaposed but not touching so that a perimeter space is left between said projections, said opposed projections being separated by a space in said mold;
   interposing in said space a slightly flexible support sheet perpendicular to and not in contact with said projections;
   pouring molten wax into said mold with dilation of said elastic material, and allowing said wax to cool and solidify with contraction of said elastic material; and
   removing said walls from said solidified wax in the form of a honeycomb having a multiplicity of hexagonal cells corresponding to the projections in a pair of opposed faces, and said support sheet incorporated within the honeycomb.

2. Process according to claim 1, wherein at least two said walls without projections are hinged together, and one said wall is removed from said solidified wax by opening the hinge.

3. Process according to claim 1, wherein said elastic material is a solidified elastomer.

4. Process according to claim 3, wherein aid elastomer is a silicone.

5. Process according to claim 1, comprising:
   molding two honeycombs each having cells in one face thereof;
   joining said two honeycombs at the faces opposite the faces having the cells, to form a compound honeycomb.

6. Process according to claim 1, wherein said support sheet includes orifices passing therethrough.

* * * * *